United States Patent
Huang et al.

(10) Patent No.: US 9,325,570 B2
(45) Date of Patent: Apr. 26, 2016

(54) NETWORK ROUTING SYSTEM

(71) Applicant: Ubiquiti Networks, Inc., San Jose, CA (US)

(72) Inventors: An-Cheng Huang, Cupertino, CA (US); Stig Thormodsrud, Sunnyvale, CA (US); Robert J. Pera, San Jose, CA (US)

(73) Assignee: UBIQUITI NETWORKS, INC., San Jose, CA (US)

( * ) Notice: Subject to any disclaimer, the term of this patent is extended or adjusted under 35 U.S.C. 154(b) by 543 days.

(21) Appl. No.: 13/740,088

(22) Filed: Jan. 11, 2013

(65) Prior Publication Data

US 2014/0143374 A1   May 22, 2014

Related U.S. Application Data

(60) Provisional application No. 61/727,617, filed on Nov. 16, 2012.

(51) Int. Cl.
| | |
|---|---|
| *G06F 15/16* | (2006.01) |
| *H04L 12/24* | (2006.01) |
| *H04L 12/771* | (2013.01) |
| *H04L 12/773* | (2013.01) |

(52) U.S. Cl.
CPC ........ *H04L 41/0803* (2013.01); *H04L 41/0253* (2013.01); *H04L 45/56* (2013.01); *H04L 45/60* (2013.01)

(58) Field of Classification Search
USPC .......................................... 709/217, 220, 238
See application file for complete search history.

(56) References Cited

U.S. PATENT DOCUMENTS

| | | | | |
|---|---|---|---|---|
| 8,458,327 | B1 * | 6/2013 | Cheng | H04L 47/37 709/217 |
| 2008/0248794 | A1 * | 10/2008 | Mirza-Baig | H04L 41/0809 455/423 |
| 2010/0115415 | A1 * | 5/2010 | Hickey | 715/736 |
| 2013/0173772 | A1 * | 7/2013 | Nitu | H04L 41/0806 709/223 |
| 2013/0232223 | A1 * | 9/2013 | Ma | 709/217 |
| 2013/0263017 | A1 * | 10/2013 | Moyers et al. | 715/753 |

OTHER PUBLICATIONS

Iijima, Tomoyuki et al., "NETCONF over WebSocket", Nov. 18, 2011, http://www.ietf.org/proceedings/82/slides/netconf-1.pdf.

Cisco, "White Paper Cisco NX-OS Software: Business-Critical Cross-Platform Data Center OS", Jan. 1, 2010, http://www.cisco.com/c/en/us/products/collateral/switches/nexus-7000-series-switches/white_paper_c11-622511.pdf.

Open Networking Foundation, "OpenFlow Management and Configuration Protocol", Jun. 25, 2012, https://www.opennetworking.org/images/stories/downloads/sdn-resources/onf-specifications/openflow-config/of-config-1.1.pdf.

* cited by examiner

*Primary Examiner* — Liangche A Wang
(74) *Attorney, Agent, or Firm* — Shun Yao; Park, Vaughan, Fleming & Dowler LLP

(57) ABSTRACT

One embodiment of the present invention provides a switching system. During operation, the switching system maintains a control-plane operating system and a web server which is in communication with the control-plane operating system. The system then sends content by the web server to a browser without being solicited by the browser, and allows a user to configure the switching system via a command line interface within the browser.

21 Claims, 6 Drawing Sheets

NETWORK ROUTING SYSTEM

RELATED APPLICATION

This application claims the benefit of U.S. Provisional Application No. 61/727,617, entitled "NETWORK ROUTING SYSTEM," filed 16 Nov. 2012.

BACKGROUND

1. Related Art

This disclosure is generally related to network switching equipment. More specifically, this disclosure is related to a system for routing data traffic in a local or enterprise network.

2. Field

The exponential growth of the Internet has made it a popular delivery medium for heterogeneous data flows. Such heterogeneity has caused an increasing demand for bandwidth. As a result, equipment vendors race to build larger and faster switches with versatile capabilities for the Internet backbone. An equally significant increase in bandwidth is also present in the edge networks (such as a local area, home, or enterprise network). Often, an end user needs to deploy a router to route traffic either within his local network, or between the local network and the external network. For example, for a small business that deploys multiple layer-2 broadcast domains (such as subnets or virtual local area networks (VLANs)), to switch traffic between these layer-2 broadcast domains, a router is often used to forward traffic at the network layer (i.e., the IP layer). Also, an enterprise often divides its network into three zones: a local area network which is isolated from the public network (e.g., the Internet), the public network, and a demilitarized zone (DMZ) which is a physical portion of local area network but exposed to the external public network. A router is commonly used to facilitate such network deployment. Hence, routers are often an indispensable part of a business or home network.

SUMMARY

One embodiment of the present invention provides a switching system. During operation, the switching system maintains a control-plane operating system and a web server which is in communication with the control-plane operating system. The system then sends content by the web server to a browser without being solicited by the browser, and allows a user to configure switching system via a command line interface within the browser.

In a variation on this embodiment, the system uses a WebSocket protocol to send the content.

In a variation on this embodiment, the system allows the user to install user-provided software on the switching system via the command line interface.

In a variation on this embodiment, the system subscribes to a statistic collected for packets transmitted or received by the switching system.

In a further embodiment, the system provides the collected statistic to the web server. The web server then streams the statistic to the browser.

In a further embodiment, while streaming the statistic to the browser, the web server sends updates to the browser at regular time intervals or in response to events observed at the switching system.

In a variation on this embodiment, the system provides one or more of the following functions: IPv4 routing, IP v6 routing, Stateful firewalling, Internet Protocol Security (IPsec), and virtual private network.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the present invention provide a network routing system that has a cost-effective architecture and provides a user-friendly configuration interface which allows the user to access a command line interface (CLI) of the router's operating system via a web browser. The routing system uses a system-on-a-chip (SOC) as the underlying hardware and employs a software architecture that can be closely coupled to the SOC to facilitate router functions. Furthermore, the configuration software of the routing system uses WebSocket to provide a user with real-time statistics reporting and allows the user to log into the router's CIA using a regular web browser.

Figure 1:
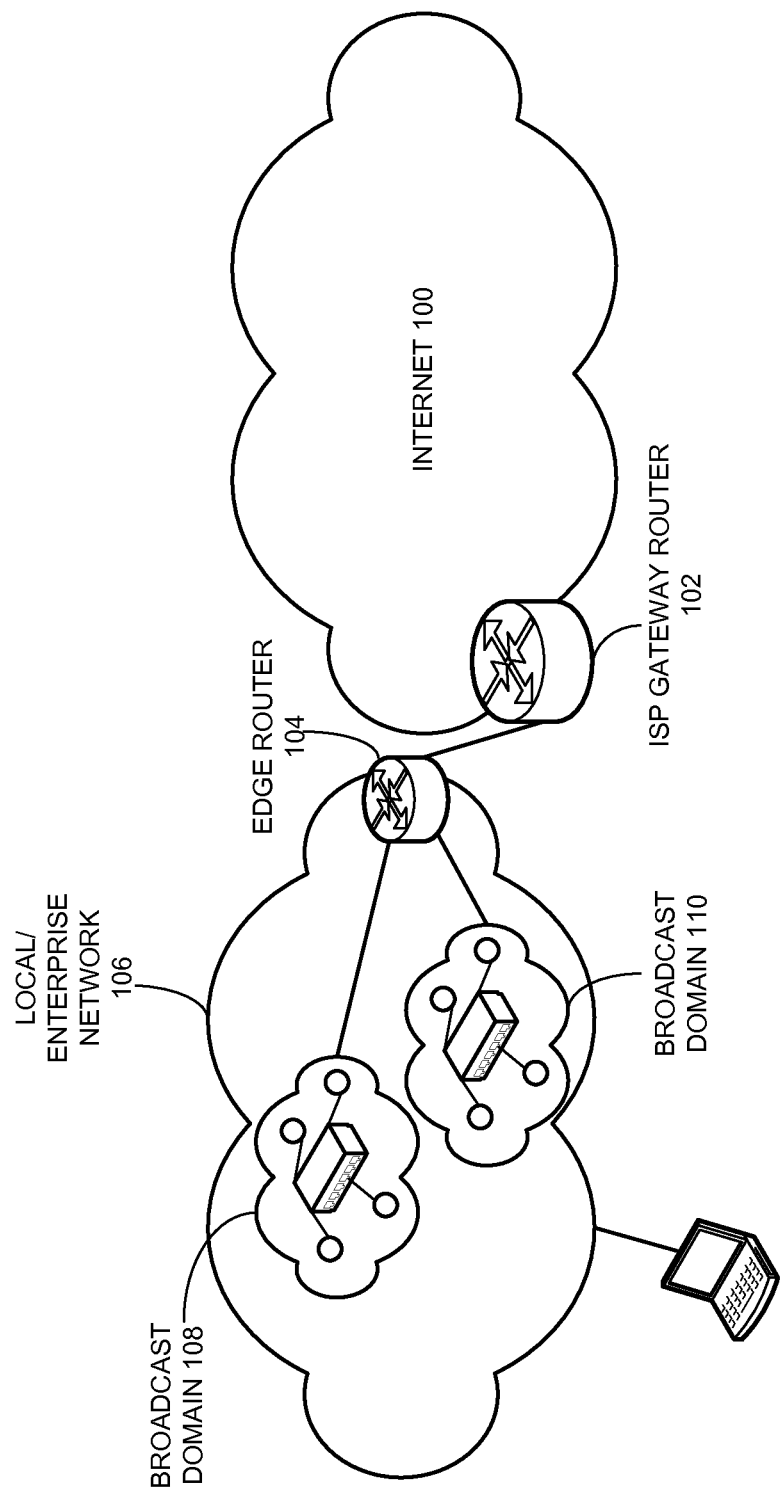
FIG. 1 illustrates an exemplary network architecture with a router.

FIG. 1 illustrates an exemplary network architecture with a router. In this example, an Internet service provider (ISP) gateway router 102 provides access to Internet 100. ISP gateway router 102 is coupled to a router 104, which provides access to Internet 100 to a local/enterprise network 106. Local/enterprise network 106 includes two layer-2 broadcast domains 108 and 110. Each broadcast domain is served by a layer-2 (Ethernet) switch.

In one embodiment, router 104 provides several functions. For local/enterprise network 106's internal traffic, router 104 can switch traffic between layer-2 broadcast domains 108 and 110. Normally, local traffic within the same layer-2 broadcast domain can be switched by a layer-2 switch without any IP address processing. For example, an Ethernet switch can forward Ethernet frames based on their medium access control (MAC) destination address (DA), as long as the frames belong to the same layer-2 broadcast domain.

For inter-broadcast domain traffic, however, such frames are typically processed on layer 3, i.e., the IP layer. In other words, if a frame's destination IP address cannot be mapped to any MAC DA in the same layer-2 broadcast domain, the Ethernet switch would forward this frame to router 104. Router 104 then removes the frame's current layer-2 header, looks up the frame's IP destination address, and encapsulates the frame with a new layer-2 header (which includes the MAC DA on a different layer-2 broadcast domain).

For traffic originated within local/enterprise network 106 but destined for Internet 100, router 104 performs network address translation (NAT) on these IP packets, so that external IP packets can be properly delivered to a device with an internal IP address.

Figure 2:
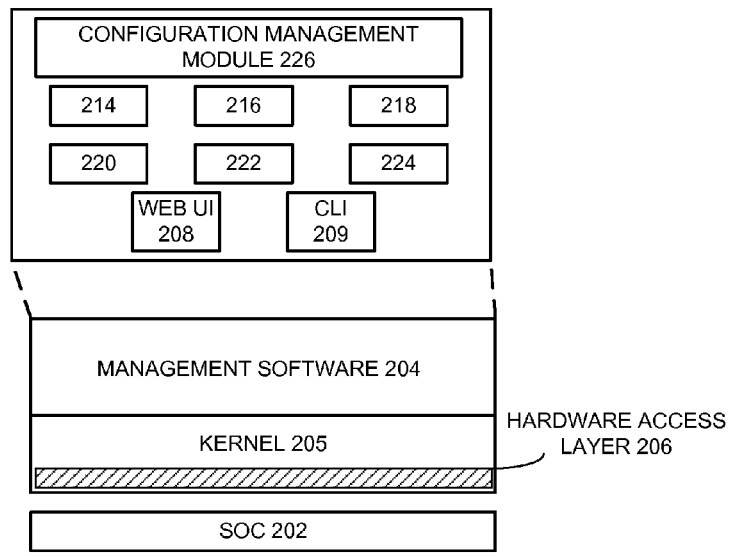
FIG. 2 illustrates an exemplary software architecture of a router.

Router 104 can also implement additional network features, such as firewall using an IP table and virtual router redundancy protocol (VRRP), as described in more detail in conjunction with FIG. 2.

FIG. 2 illustrates an exemplary software architecture of a router. In this example, the router is based on an SOC chip 202. In one embodiment, SOC chip 202 can be an off-the-shell chip, such as a multi-core chip based on the MIPS instruction set. In the case of a multi-core SOC 202, in some embodiments, a number of processors on SOC 202 can be running dedicated packet processing engine(s), and other processors can be running another operating system (such as Linux) for the control plane.

Running on top of SOC 202 is an operating system kernel 205 and management software 204 for the control plane. In one embodiment, kernel 205 is based on Linux. In addition, a hardware access layer 206 is included in kernel 205, so that software 204 and SOC 202 can work seamlessly. In one embodiment, hardware access layer 206 provides certain hardware acceleration functions which allow kernel 205 to process packets at increased speeds using hardware components in SOC 202.

Also included in management software 204 is a WEB user interface (UI) module 208 and a command-line interface (CD) module 209. As described later, WEB UI provides a configuration UI via which a user can obtain real-time router statistics and access the router's control-plane OS using either the graphical interface or the integrated CLI.

Management software 204 further includes a configuration management module 226 and a number of function modules 214, 216, 218, 220, 222, and 224. Kernel 205 allows configuration management module 226 to interact with the underlying hardware. In one embodiment, configuration management module 226 can be a proprietary software module, or an open-source based software module. Note that Web UI is only an example of "management interface." Configuration management module 226 can support different kinds of management interfaces such as Web UI, CLI, remote management application, etc.

Configuration management modules 226 may control a number of functions using function modules 214, 216, 218, 220, 222, and 224, which can include advanced IPv4 and IPv6 routing, stateful firewalling, IPSec VPN, intrusion detection and prevention, etc.

Figure 3:
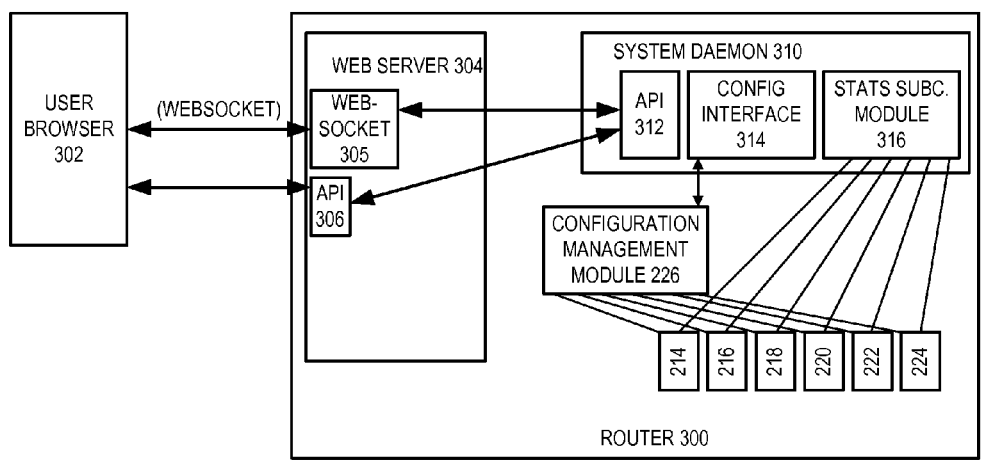
FIG. 3 presents a block diagram illustrating the configuration mechanism for a router.

FIG. 3 presents a block diagram illustrating the Web UI operations and the configuration mechanism for a router. In this example, a web server 304 residing in a router 300, and a user browser 302 accesses the Web UI by communicating with Web server 304 through two different channels. One channel is through an application interface (API) module 306, which can be implemented in different ways. One of such implementation is based on a scripting language module, which for example can be a PHP module. This API module 306 is used to access the configuration mechanism. The other channel is through a WebSocket module 305, which is used to access the subscription mechanism.

Both API module 306 and WebSocket module 305 communicate with an API 312 residing in a system daemon 310 to access the configuration mechanism and the subscription mechanism, respectively. System daemon 310 is a process running in the control-plane OS that is responsible for communicating with and controlling router function modules 214, 216, 218, 220, 222, and 224 (such as firewall, VPN, and network address translation (NAT) functions).

In one embodiment, system daemon 310 includes a configuration interface 314 and a statistics subscription module 316. During operation, configuration interface 314 is in communication with configuration management module 226, which in turn configures and controls function modules 214, 216, 218, 220, 222, and 224 (or a subset thereof). For example, configuration interface 314 can pass on user input to configuration management module 226 to configure a firewall module, or a VPN module. In addition, the Web UI can use statistics subscription module 316 to subscribe to statistics collected by a respective function module. As a result, the function module can provide statistics (either collected at regular time intervals or in response to events specified by the user), which is "pushed" to user browser through WebSocket module 305.

In an exemplary use case, when the user wishes to set firewall rules, the user can key in the specific rules (such as certain IP addresses or TCP/UDP port numbers) via user browser 302, which sends the rule data to Web server 304 (through API 306) and then to configuration interface 314 in system daemon 310 (through API 312). Subsequently, configuration interface 314 communicates this information to configuration management module 226 to configure one of the function modules responsible for implementing the firewall.

In a further embodiment, the user can subscribe to certain real-time statistics via user browser 302, which registers the subscriptions with statistics subscription module 316 through WebSocket module 305 and API module 312 in system daemon 310. During operation, such statistics can be "pushed" at regular time intervals (e.g., at a set refresh rate) via API 312, and eventually to user browser 302 via WebSocket module 305. Note that WebSocket is a protocol that facilitates full-duplex communication channels over a single TCP connection. Details on WebSocket can be found in IETF RFC 6455, available at http://tools.ietf/org/html/rfc6455, the disclosure of which is incorporated by reference herein.

Figure 4:
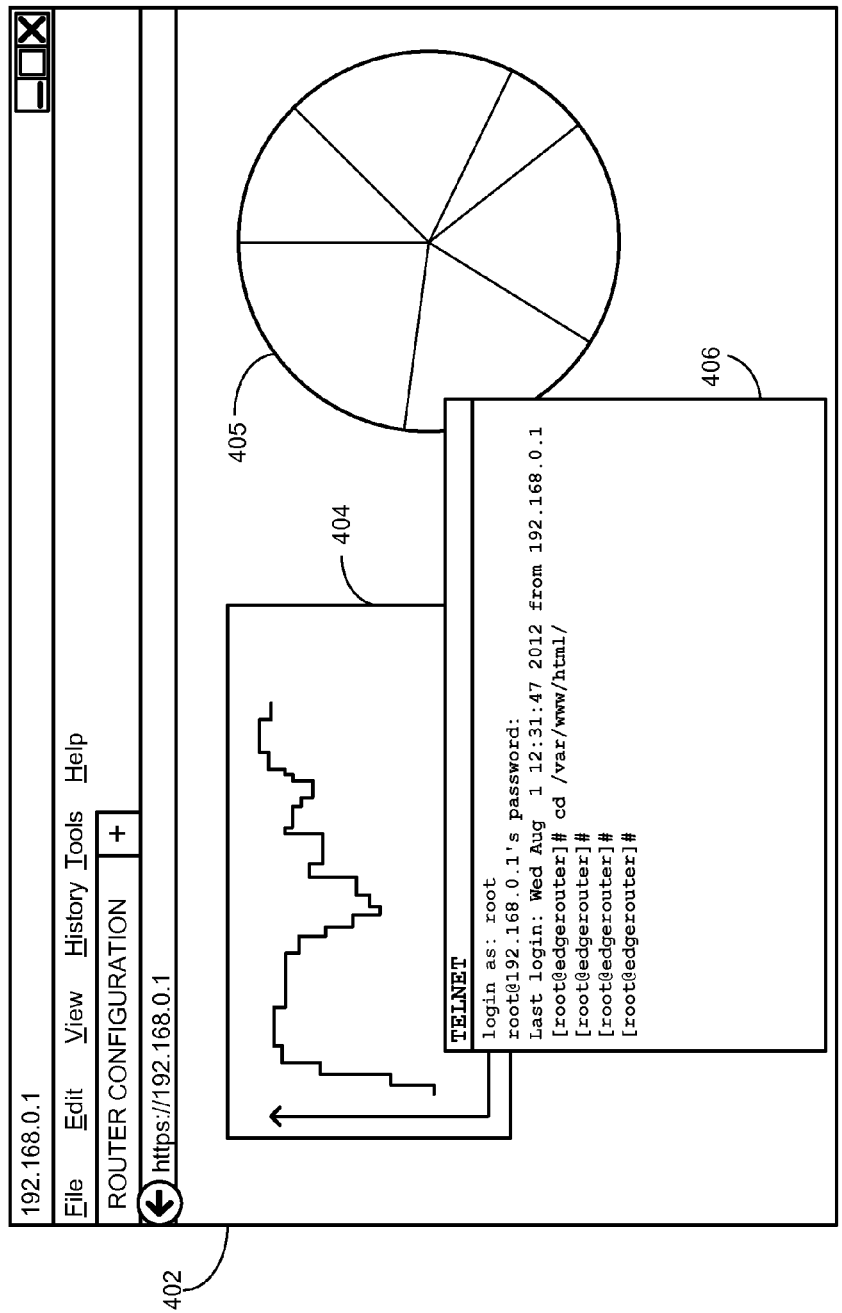
FIG. 4 presents an exemplary screenshot of a user browser window associated with a configuration interface of a router.

In addition to real-time statistics, the Web UI also allows the user to directly log into the CLI of the control-plane OS within user browser 302. FIG. 4 presents an exemplary screenshot of a user browser window associated with a configuration interface of a router. As illustrated in this example, a user can log into to router by typing into a browser window 402 the router's IP address (which in this case is 192.168.0.1, although other addresses are also possible).

In response, the router can provide a web-based configuration interface, in the form of a web page. Here, the screenshot shows two real-time statistics figures, 404 and 405. In one embodiment, the user can initiate (for example, by clicking a button (not shown)) a CLI window 406. In response, the web server in the router can start a WebSocket session, which relays the user's input to the system daemon and relays the CLI's response back to user browser window 402. In one embodiment, the CLI is provided via a TELNET session. Other remote terminal protocols, such as SSH or rlogin, can also be used.

Note that since the CLI provides user complete access to the router's OS, the user can install his own software packages on top of the router's OS. For instance, the user can install a specialized security application. The user can also install traffic monitoring/engineering software.

Figure 5:
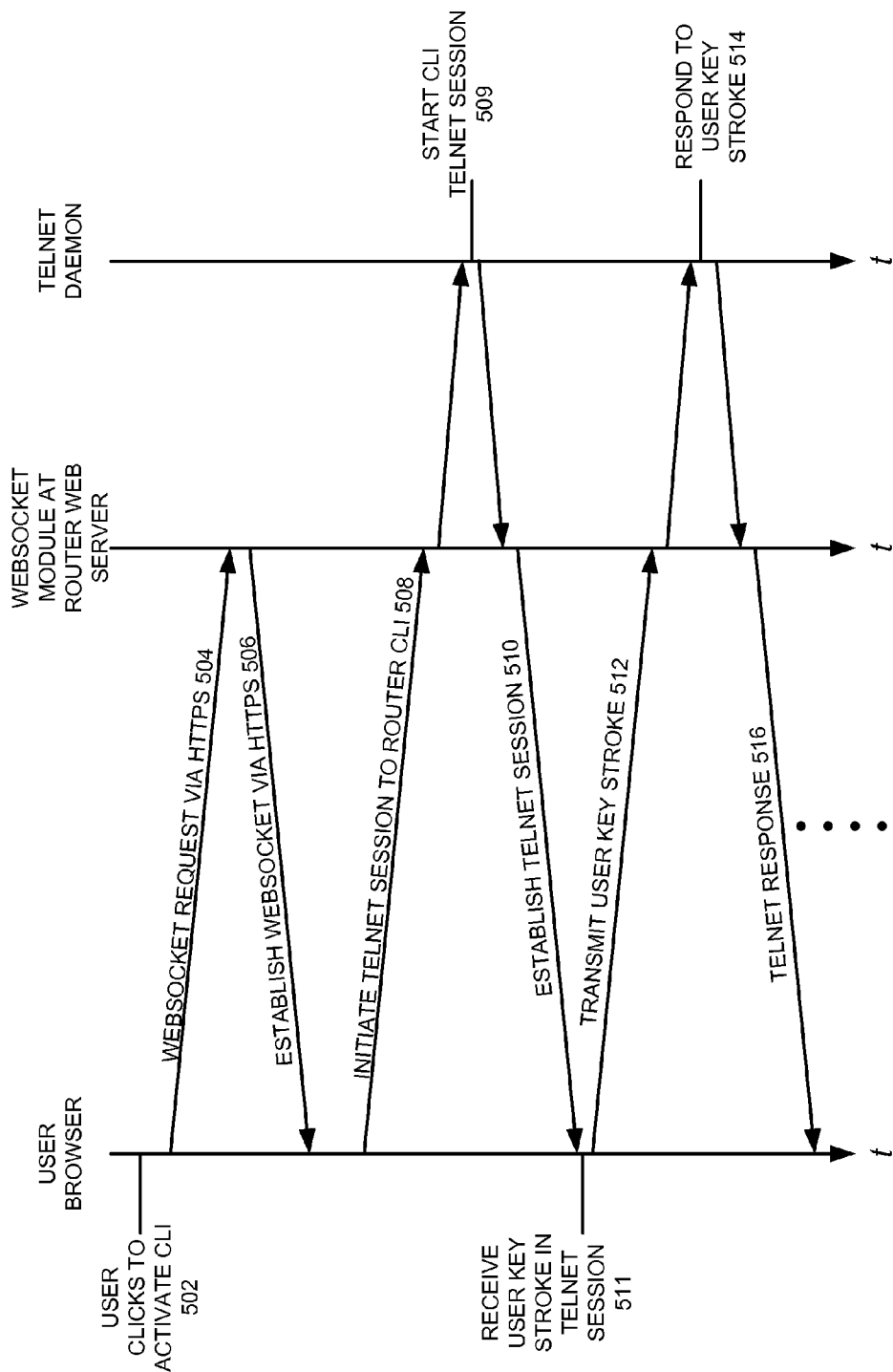
FIG. 5 presents a timing diagram illustrating an exemplary process of initiating a command line interface (CLI) session within a user browser window.

FIG. 5 presents a timing diagram illustrating an exemplary process of initiating a command line interface (CLI) session within a user browser window. During operation, the user clicks within a user browser window to activate the CLI session (operation 502). In response, the user browser sends a WebSocket request via secure http (https) (operation 504). In turn, the WebSocket module at the router's web server sends a response back via https to establish the WebSocket session (operation 506).

Subsequently, the user's web browser initiates a telnet session to the router's CLI (operation 508). The WebSocket module at the router's web server then relays this request to a telnet daemon running in the control-plane OS. As a result, the telnet daemon starts a CLI telnet session fir the user (operation 509), and sends a response via the WebSocket module to the user browser to establish the telnet session (operation 510).

Next, the user browser initiates a window within the browser for the telnet session, and receives a user key stroke in the telnet session (operation 511). The browser then transmits this key stroke to the WebSocket module in the router's web server (operation 512), which in turn relays this key stroke to the telnet daemon. The telnet daemon then responds to the key stroke (operation 514). Note that the response can be an echo of the key stroke, or a series of ASCII symbols if the key stroke is a carriage return which issues a command. The telnet response is then relayed to the user browser (operation 516).

Figure 6A:
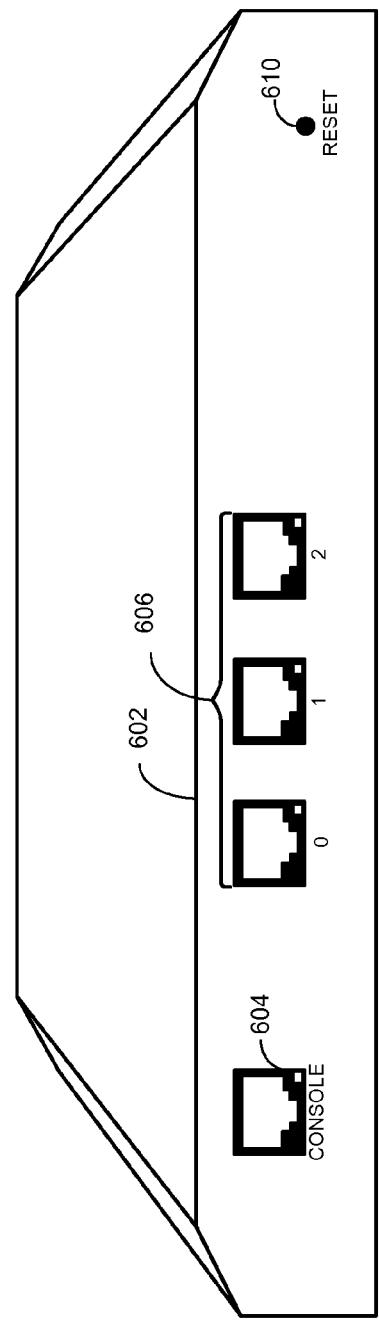
FIG. 6A presents a frontal view of the the exterior of an exemplary router.

FIG. 6A presents a frontal view of the exterior of an exemplary router. In this example, the front faceplate of a router 602 includes a management. port 604 and three regular ports 606. In one embodiment, management port 604 and regular data ports 606 are RJ45 ports. Management port 604 is a dedicated port that allows a user to connect to router 602 and log into its configuration web page using a default address, regardless of its configuration state. Management port 604 can be an Ethernet port or a serial RS-232 port. Regular data ports 606 are used for forwarding regular data traffic.

In one embodiment, each port also includes an LED status indicator light. A green light means the port is functional at 1000 Mbps, a yellow light means the port is functional at 10/100 Mbps, and a red light means the port is down. Also included on the faceplate is a reset button 610, which when depressed for a certain amount of time resets router 602 to its factory default state.

Figure 6B:
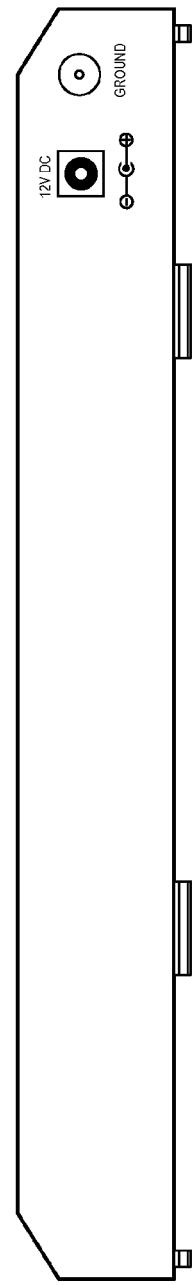
FIG. 6B presents a rear view of the exterior of an exemplary router.

FIG. 6B presents a rear view of the exterior of an exemplary router.

Figure 7:
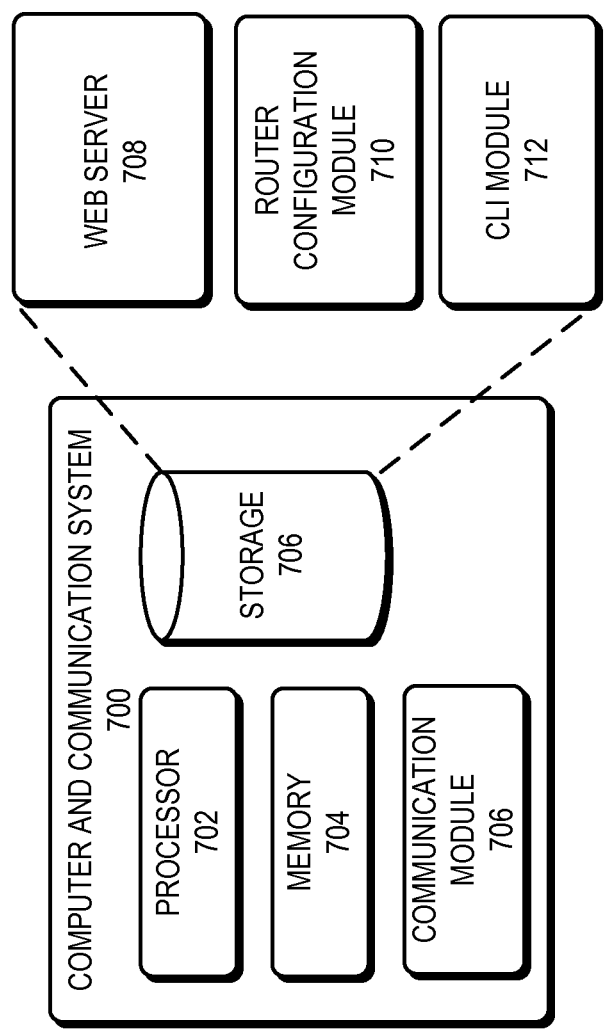
FIG. 7 illustrates an exemplary architecture of a router.

FIG. 7 illustrates an exemplary architecture of a router. In general, the router described herein can be a computer and communication system 700, which includes one or more processors 702, memory 704, a communication module 706, and a storage device 706. Storage device 706 stores instructions that implement a web server 708, a router configuration module 710, and a CLI module 712. During operation, the instructions stored in storage 706 are loaded into memory 704 and executed by processor 702. Communication module 706 may further include one or more packet processors that perform the switching and packet processing functions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A switching system, comprising:
    a processor;
    memory;
    a control-plane operating system; and
    a web server in communication with the control-plane operating system;
    wherein the web server comprises a communication module that:
    sends, to a browser on a client device, a web page that includes a network-statistics user interface, and includes a command line interface, wherein the command line interface is configured to allow a user to install user-provided software on the switching system;
    sends network statistics to the browser on the client device without being solicited by the browser;
    receives configuration commands from the user via the command line interface within the browser; and
    configures a network parameter or a security parameter of the switching system according to the configuration commands received via the command line interface within the browser; and
    wherein the communication module implements a protocol that facilitates full-duplex communication channels over a single TCP connection.

2. The switching system of claim 1, wherein the communication module implements a WebSocket protocol.

3. The switching system of claim 1, further comprising a statistics subscription module configured to subscribe to a statistic collected for packets transmitted or received by the switching system.

4. The switching system of claim 3, wherein the statistics subscription module is configured to provide the collected statistic to the web server; and
    wherein the web server is configured to stream the statistic to the browser.

5. The switching system of claim 4, wherein while streaming the statistic to the browser, the web server is configured to send updates to the browser at regular time intervals or in response to events observed at the switching system.

6. The switching system of claim 1, further comprising a function module operable to generate the network statistics.

7. The switching system of claim 6, wherein the function modules in the web server facilitate one or more of the following functions:
 IPv4 routing;
 IP v6 routing;
 Stateful firewalling;
 network address translation;
 Internet Protocol Security (IPsec); and
 virtual private network.

8. A method for facilitating a switching system, comprising:
 maintaining a control-plane operating system;
 maintaining a web server which is in communication with the control-plane operating system;
 sending, to a browser on a client device, a web page that includes a network-statistics user interface, and includes a command line interface, wherein the command line interface allows a user to install user-provided software on the switching system;
 sending network statistics by the web server to the browser on the client device without being solicited by the browser, wherein sending the web page or network statistics comprises using a protocol that facilitates full-duplex communication channels over a single TCP connection;
 receiving configuration commands from a user via the command line interface within the browser; and
 configuring a network parameter or a security parameter of the switching system in accordance with the configuration commands received via the command line interface within the browser.

9. The method of claim 8, wherein the protocol is a WebSocket protocol.

10. The method of claim 8, further comprising subscribing to a statistic collected for packets transmitted or received by the switching system.

11. The method of claim 10, further comprising providing the collected statistic to the web server; and
 streaming the statistic from the web server to the browser.

12. The method of claim 11, wherein streaming the statistic to the browser comprises sending updates to the browser at regular time intervals or in response to events observed at the switching system.

13. The method of claim 8, wherein the network statistics are collected by a function module.

14. The method of claim 13, wherein the function modules facilitate one or more of the following functions:
 IPv4 routing;
 IP v6 routing;
 Stateful firewalling;
 network address translation;
 Internet Protocol Security (IPsec); and
 virtual private network.

15. A switching system, comprising a processor and a memory coupled to the processor, wherein the memory stores instructions which when executed by the processor cause the processor to perform a method, the method comprising:
 maintaining a control-plane operating system;
 maintaining a web server which is in communication with the control-plane operating system;
 sends, to a browser on a client device, a web page that includes a network-statistics user interface, and includes a command line interface, wherein the command line interface allows a user to install user-provided software on the switching system;
 sending network statistics by the web server to the browser on the client device without being solicited by the browser, wherein sending the web page or network statistics comprises using a protocol that facilitates full-duplex communication channels over a single TCP connection;
 receiving configuration commands from a user via the command line interface within the browser; and
 configuring a network parameter or a security parameter of the switching system in accordance with the configuration commands specified via the command line interface within the browser.

16. The switching system of claim 15, wherein the protocol is a WebSocket protocol.

17. The switching system of claim 15, wherein the method further comprises subscribing to a statistic collected for packets transmitted or received by the switching system.

18. The switching system of claim 17, wherein the method further comprises providing the collected statistic to the web server; and
 streaming the statistic from the web server to the browser.

19. The switching system of claim 18, wherein streaming the statistic to the browser comprises sending updates to the browser at regular time intervals or in response to events observed at the switching system.

20. The switching system of claim 15, further comprising a function module operable to generate the network statistics.

21. The switching system of claim 20, wherein the function modules facilitate one or more of the following functions:
 IPv4 routing;
 IP v6 routing;
 Stateful firewalling;
 etwork address translation;
 Internet Protocol Security (IPsec); and
 virtual private network.

* * * * *

UNITED STATES PATENT AND TRADEMARK OFFICE
CERTIFICATE OF CORRECTION

PATENT NO. : 9,325,570 B2
APPLICATION NO. : 13/740088
DATED : April 26, 2016
INVENTOR(S) : An-Cheng Huang et al.

Page 1 of 1

It is certified that error appears in the above-identified patent and that said Letters Patent is hereby corrected as shown below:

In the claims,
In claim 21 (column 8, line 48), the word "etwork" should read "network"

Signed and Sealed this
Twelfth Day of July, 2016

Michelle K. Lee
*Director of the United States Patent and Trademark Office*